United States Patent [19]

Furukawa et al.

[11] 4,211,432
[45] Jul. 8, 1980

[54] WEBBING GUIDE

[75] Inventors: Haruki Furukawa, Toyota; Susumu Usami, Nagoya; Junichi Nakaho, Ichinomiya, all of Japan

[73] Assignees: Toyota Jidosha Kogyo Kabushiki Kaisha; Kabushiki Kaisha Tokai Rika Denki Seisakusho, both of Aichi, Japan

[21] Appl. No.: 974,064

[22] Filed: Dec. 28, 1978

[30] Foreign Application Priority Data

Dec. 28, 1977 [JP] Japan .................. 52/176871[U]

[51] Int. Cl.$^2$ ............................................. A62B 35/00
[52] U.S. Cl. ................................ 280/808; 242/76; 242/107.4 R
[58] Field of Search ............................. 242/107–107.7, 242/76; 226/196–199; 297/388, 389; 308/4 R; 280/801–808; 24/163 FC, 163 R, 200

[56] References Cited

U.S. PATENT DOCUMENTS

| 3,039,834 | 6/1962 | Howe | 308/4 |
| 3,879,054 | 4/1975 | Lindblad | 280/747 |
| 3,959,855 | 6/1976 | Fisher | 280/747 X |
| 4,005,904 | 2/1977 | Weman et al. | 280/747 X |
| 4,023,826 | 5/1977 | Kokubo et al. | 280/747 |
| 4,130,253 | 12/1978 | Yasumatsu | 242/107.4 R X |

Primary Examiner—John M. Jillions
Attorney, Agent, or Firm—Koda and Androlia

[57] ABSTRACT

A webbing guide provided with a contact portion for receiving and guiding a webbing. Furthermore, a belt-like low friction material is bonded to the outer periphery of said contact portion. And the region of said low friction material bonded to said contact portion covers respective side portions each extending over an angle of 90° from a vertical line passing through the center of said contact portion.

2 Claims, 11 Drawing Figures

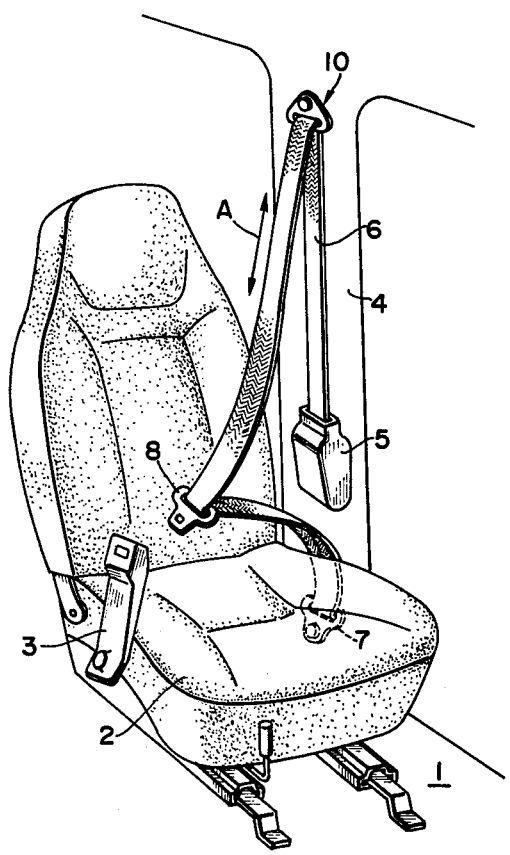
FIG. 1
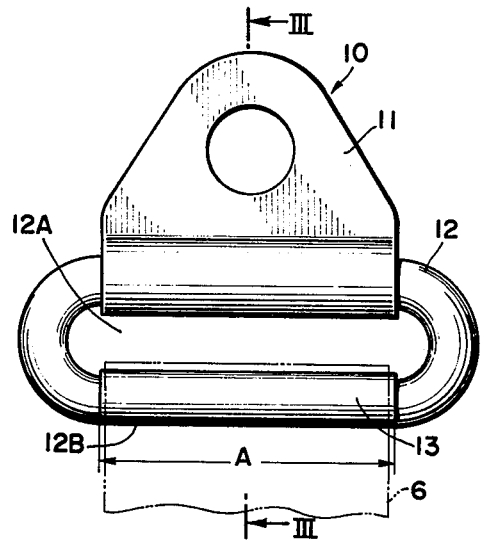
FIG. 2
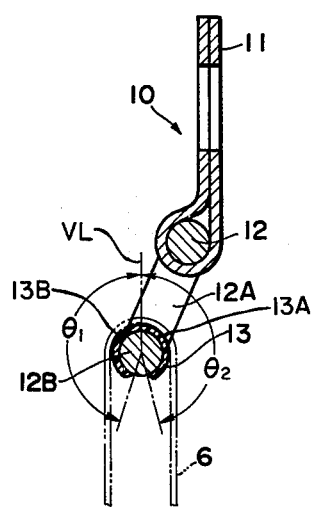
FIG. 3
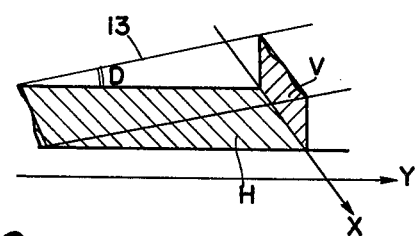
FIG. 4
FIG. 5
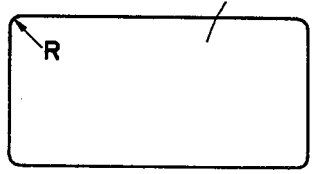
FIG. 6

WEBBING GUIDE

BACKGROUND OF THE INVENTION

1. Field of Invention

This invention relates to a webbing guide for use in a seatbelt system for restraining an occupant by an occupant restraining webbing to protect him, and particularly to a webbing guide preferable for lightening frictional resistance with a webbing which is received therein.

2. Prior Art

In general, one end of the webbing for use in a seatbelt system has been wound up by a retractor solidly secured to the vehicle, whereby the remaining portion of the webbing is wound up in layers, thus improving the handling condition of the seatbelt system. The intermediate portion of the webbing to be wound up by said retractor can be wound around a webbing guide solidly secured to the vehicle to guide it, to thereby make proper the arrangement of the webbing and the retractor. In this case, however, it is necessary to reduce the frictional resistance between the webbing to be received and said webbing guide. In case there is a high frictional resistance therebetween, a bad influence is exerted on the wind-up force of the retractor, and there are encountered such disadvantages that the pull-out force on the webbing is decreased, the feeding of the webbing when the webbing is pulled out is made difficult, and so forth.

Then, in the conventional webbing guide, chrome plating, painting or the like have been applied to the contact portion for receiving a guiding the webbing to thereby intend to reduce the frictional resistance. However, there have been few cases where such conventional webbing guides as described above are directly adhesively attached thereon with low friction materials. Namely, in the case the low friction material is adhesively attached on the contact portion of the webbing guide, there have been encountered such problems that the low friction material adhesively attached to the contact portion having a small diameter does not get to fit well with the contact portion, end portions of said material tend to come off, further, the end portions of said material are acted on by stress concentration due to thermal shrinkage or thermal expansion of said material, resulting in peeling, and a low friction material having a large thickness is preferred for securing durability against wear due to the insertion of the webbing, which makes it more difficult to realize reliable bonding condition.

SUMMARY OF THE INVENTION

Accordingly, it is the general object of the present invention to provide a webbing guide wherein a low friction material highly resistant to being peeled off is adhesively attached, and sliding resistance of the webbing is lightened.

In keeping with the principles of the present invention, the object is accomplished by a unique webbing guide provided with the contact portion for receiving and guiding the webbing, a belt-like low friction material is bonded to the outer periphery of said contact portion, and the region of said low friction material bonded to said contact portion covers respective side portions each extending over an angle of 90° from a vertical line passing through the center of said contact portion.

BRIEF DESCRIPTION OF THE DRAWINGS

The above-mentioned features and objects of the present invention will become more apparent with reference to the following description, taken in conjunction with the accompanying drawings, wherein like referenced numerals denote like elements, and in which:

FIG. 1 is an oblique view showing one example of the seatbelt system using the webbing guide according to the present invention;

FIG. 2 is a front view showing one embodiment of the webbing guide according to the present invention;

FIG. 3 is a cross-sectional view taken along the line III—III in FIG. 2;

FIG. 4 is an enlarged cross-sectional view showing the essential portions thereof;

FIG. 5 is an enlarged perspective view showing the end portions bonded of the low frictional material;

FIG. 6 is a plain view showing the low frictional material prior to the bonding;

DETAILED DESCRIPTION OF THE INVENTION

Figure 7:
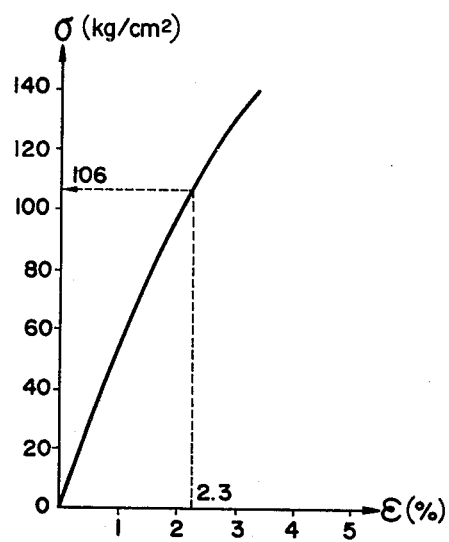
FIG. 7 is a diagram showing the relationship between the degree of elongation and the pulling stress.

Referring more particularly to the drawings, illustrated in FIG. 1 is an explanatory view showing the seatbelt system using the webbing guide according to the present invention, in which mounted on a floor member 1 of the vehicle is a seat 2 for an occupant, at one side of which buckle means 3 is erected.

Disposed at the side opposite to the buckle means 3 of the seat 2 is a center pillar 4 contiguous to the floor member 1, and installed at the substantially intermediate portion of the center pillar 4 is a retractor 5 which is adapted to wind up one end of the webbing 6 for restraining the occupant through a biasing force. One end of the webbing 6 is substantially vertically erected from the retractor 5, inserted through a webbing guide 10 installed at the upper portion of the center pillar 4, and the other end is engaged with the lower portion of the center pillar 4 through an anchor 7. Additionally, a tongue plate 8 is slidably mounted on the webbing 6 between the anchor 7 and the webbing guide 10, and the tongue plate 8 is engaged with the buckle means 3 so that the occupant seated on the seat 2 can be restrained by the webbing 6 in a three point seatbelt system.

As shown in FIGS. 2 and 3, the webbing guide 10 comprises a base 11, a ring 12 and a low friction material 13.

Ring 12 has such a form that the axis of a metal rod having a round cross-section is bent into an oblong form in a manner that respective ends of two parallel straight rod portions are bent into semicircular arcs and connected to each other. An oblong opening thus formed provides an insertion portion 12A for receiving the webbing 6, one of the straight rod portions is wrapped by a base 11, and the other constitutes a contact portion 12B to which a low friction material 13 is bonded.

The base 11 has such a form that thin metal plate is folded into two, a portion thus bent is wrapped with one of the straight rod portions of the ring 12, and solidly secured to the center pillar 4 after reliably securing the ring 12.

The low friction material 13 is a rectangular member made of a tape of ethylene tetra-fluoride resin or the like, and is bonded to the contact portion 12B in the axial direction thereof for a bonding length A longer than the width of the webbing 6, and in the circumferential direction thereof for a bonding region covering respective side portions 13A and 13B extending over angles of $\theta_1$ and $\theta_2$, respectively, from a vertical line VL passing through the center of said contact portion. The angles of bonding $\theta_1$ and $\theta_2$ are set at more than 90°, respectively, so that such possibility is decreased that opposite end portions of the low friction material 13 touch the webbing 6 to be peeled off.

The method of bonding the low friction material 13 to the contact portion includes bonding a tape previously applied with an adhesive mass to the low friction material 13 surface-treated to a condition capable of being bonded, or the like.

Now, the opposite ends of the low friction material 13 to be bonded to the contact portion 12B are chamfered at a chamfer angle D. Said chamfer angle D s given by $$D \leq \tan^{-1} F/S \tag{1}$$

where S is inner stress generated by thermal shrinkage and thermal expansion of the low friction material and F is adhesive strength under shear, so that the bonding of the low friction material is highly resistant to being peeled off.

Description will hereunder be given of the reason for that the above chamfer angle D given by the formula (1) is preferable for maintaining bonding. Namely, FIG. 5 is a view generally perspectively showing an enlarged portion of the ends of the low friction material 13, wherein a vertical portion V of the low friction material and concentrated with stress intersects the horizontal portion H of the low friction material to form an axis X, and a straight line on the porion H perpendicularly intersecting said axis X is referred to as an axis Y. Then, the area of the portion H is given by $$\int_{x_1}^{x_2} f(x)\, dx \tag{2}$$

where a function f(x) is the shape of end of the low friction material 13, and the cross-sectional area of a flat surface V passing through the axis X of the low friction material 13 and being perpendicular to the flat surface XY is given by $$\int_{x_1}^{x_2} f(x) \tan D\, dx \tag{3}$$

In addition, S is internal stress generated in the low friction material and F is adhesive strength under shear.

Now, in order to prevent the low friction material 13 from being peeled off the contact portion 12B, it is necessary that the bonding force of the bonded surface H is larger than the force of the surface V of the low friction material 13. Consequently, it suffices to meet the following formula.

$$F \int_{x_1}^{x_2} f(x)\, dx \geq S \int_{x_1}^{x_2} f(x) \tan D\, dx \tag{4}$$

Then, the formula (4) leads to the aforesaid formula (1). Said formula (1) thus obtained is applicable to any position in the bonded joint and any shape of cross-section of the low friction material 13. Accordingly, the chamfer angle D based on the formula (1) a relationship which can be generalized irrespective of the shape, material quality and the like of the low friction material 13 which is bonded to the contact portion 12B.

In addition, the low friction material 13 is chamfered not only at the ends but also at the opposite sides thereof, and moreover, the four corners of said material are chamfered or formed into said circular arcs R so that the low friction material 13 is prevented from being peeled off due to being caught by the webbing 6.

In the embodiment described above, the low friction material 13 is bonded to the contact portion 12B, whereby sliding resistance of the webbing 6 is lightened, thus resulting in better feeling in handling the webbing 6. Furthermore, the low friction material 13 whose end portions are chamfered is bonded to the contact portion 12B having a small diameter, whereby the end portions are prevented from being peeled off, and further, the peel-off is prevented which is caused by the fluctuations in the internal stress due to thermal shrinkage, thermal expansion or the like generated in the low friction material 13 by the change in the ambient conditions between the contact portion 12B and the low friction material 13, thus enabling to improve reliability in duration of the bonding.

Description will hereunder be given of an experimental example conducted by the present inventor in working of the webbing guide according to the present invention. In this experimental example, TFE, the trade name of a fluorine resin manufactured by Nitto Electric Industrial Co., Ltd. is used as the low friction material, and #500, the trade of an adhesive mass manufactured by Nitto Electric Industrial Co., Ltd. and KE42, the trade name of a silicone adhesive manufactured by Shin-etsu Chemical Industry Co., Ltd. are used as the binders.

Figure 8:
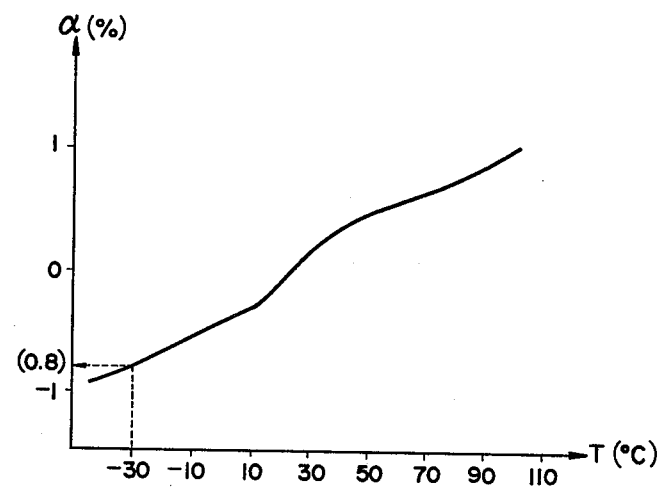
FIG. 8 is a diagram showing the change in the coefficient of thermal expansion of the low friction material.
Figure 9:
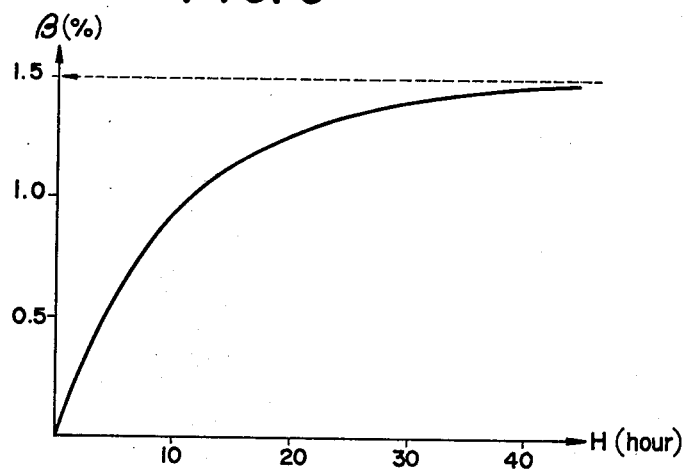
FIG. 9 is a diagram showing the change in the coefficient of thermal shrinkage of the low friction.

First, the relationship between the pulling stress $\sigma$ and the degree of elongation of the fluorine resin TFE is measured at the atmospheric temperature $-30°$ C. where the cohesion of the fluorine resin TFE reaches the highest value in the ambient conditions and FIG. 7 is obtained. Furthermore, the coefficient of linear thermal expansion $\alpha$ of the fluorine resin TFE against the temperature T is measured to obtain FIG. 8. Though said coefficient of thermal expansion $\alpha$, in fact, calculates the maximum value of deformation from the difference between the metallic contact portion and the fluorine resin TFE, the coefficient of thermal expansion of the contact portion is very small and neglected, and the maximum value of deformation is determined to be 0.8% which is caused by thermal expansion ranging from the ordinary temperature where the fluorine resin TFE is bonded to $-30°$ C. which is the lowest temperature where the vehicle is used. Additionally, the coefficient of thermal shrinkage $\beta$ of the fluorine resin TFE in which the pulling stress at the time of working against the time H is measured in the atmosphere of 100° C. exceeding 80° C. which is the highest temperature where the vehicle is used, and the maximum coefficient of thermal shrinkage 1.5% is obtained as shown in FIG. 9. Namely, in use conditions of the vehicle, the fluorine resin TFE is deformed at the rate of 0.8% by thermal expansion, also deformed at the rate of 1.5% by thermal shrinkage, and the value of deformation amounts to 2.3% on the whole. Hence, the maximum internal stress S generated in the fluorine resin TFE is 106kg/cm$^2$ as apparent from FIG. 7.

Figure 10:
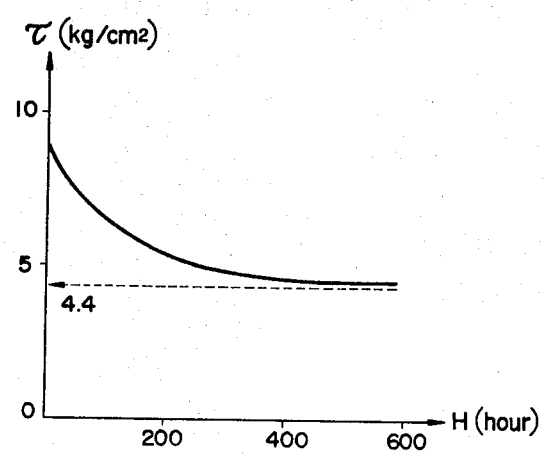
FIG. 10 and 11 are diagrams showing the changes in the bonding strength under shear of the respective bonding agents.
Figure 11:
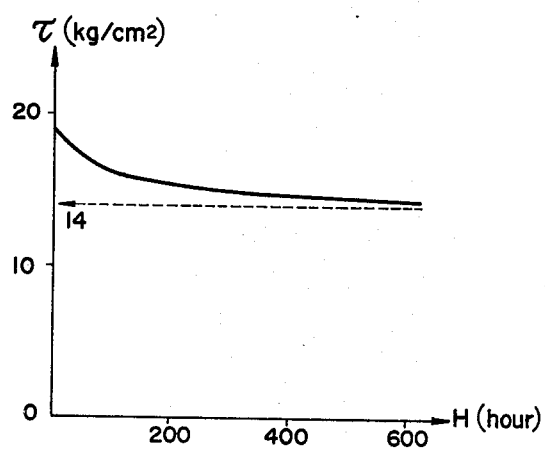

Further, if the adhesive strengths under shear $\tau$ of the bonding agents against the deterioration time H are measured, then FIG. 10 is obtained for the adhesive mass #500 and FIG. 11 for the silicone adhesive KE42. Namely, the minimum bonding strength of the adhesive mass #500 is 4.4kg/cm$^2$ and that of the silicone adhesive KE42 is 14kg/cm$^2$.

If the above values of measurement are introduced into the aforesaid formula (1) to calculate the chamfer angles at which the end portions of the fluorine resin TFE are chamfered, then the results are as shown in the following table.

Table

| BONDING AGENT | S kg/cm$^2$ | F kg/cm$^2$ | D |
| --- | --- | --- | --- |
| #500 | 106 | 4.4 | 2.4° |
| KE42 | 106 | 14 | 7.5° |

Namely, the chamfer angles at which the end faces of the fluorine resin TFE to be bonded to the contact portion are made 2.4° or less in the use of the adhesive mass #500, and those of the fluorine resin TFE are made 7.5° or less in the use of the silicone adhesive KE42, so that the peel-off phenomenon at the end portions can be prevented from occurring, thereby enabling to secure the reliability in duration of the bonding condition.

As apparent from the foregoing, according to the present invention, in the webbing guide provided therein with the contact portion for receiving and guiding the webbing, the belt-like low friction material is bonded on the outer periphery of the contact portion, and the region of said low friction material bonded to said contact portion covers respective side portions each extending over an angle of 90° from a vertical line passing through the center of said contact portion, whereby the low friction material highly resistant to being peeled off is bonded, thus presenting the advantage of lightening the sliding resistance of the webbing.

It should be apparent to one skilled in the art that the above described embodiments are merely illustrative of but a few of the many possible specific embodiments of the present invention. Numerous and varied other arrangements can be readily devised by those skilled in the art without departing from the spirit and scope of the invention.

What is claimed is:

1. A webbing guide provided with a contact portion having a center and side portion for receiving and guiding a webbing, wherein: a tape having two opposite ends made of low friction material bonded to the outer periphery of said contact portion, the region of said low friction material bonded to said contact portion covers respective side portions each extending over an angle at least equal to 90° from a vertical line passing the center of said contact portion with the ends of the tape adjacent to each other; and the opposite ends are chamfered at an angle D set at $$D \leqq \tan^{-1} F/S$$

where S is an internal stress of said low friction material and F is the bonding strength of the bonding agent used.

2. A webbing guide as set forth in claim 1 wherein said low friction material includes four corners and opposite side portions and is chamfered at the four corners as well at the opposite side portions.

* * * * *